(No Model.)
A. MINOR.
DOUBLETREE.
No. 405,316. Patented June 18, 1889.
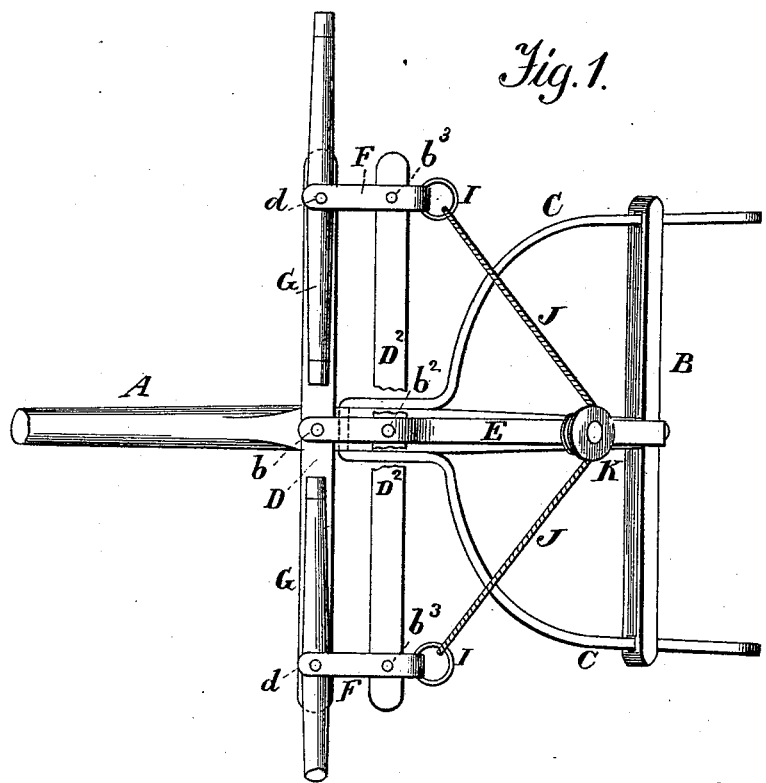
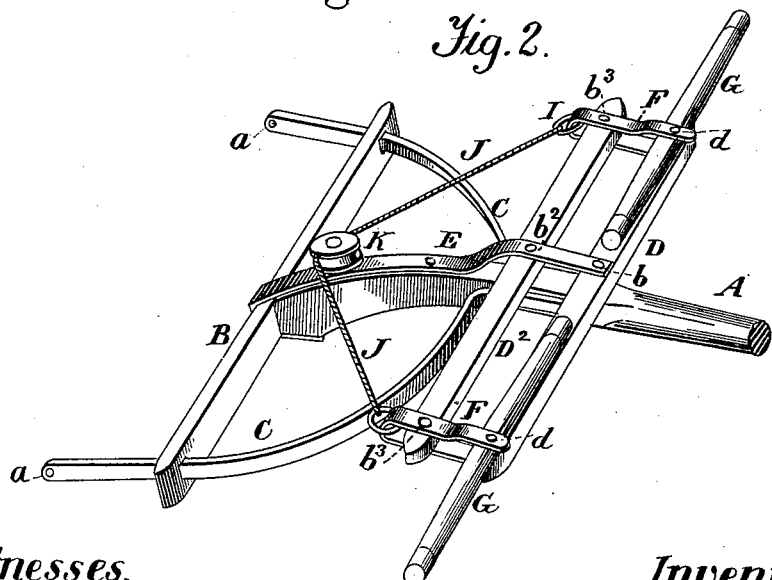
Witnesses.
A. Ruppert
V. L. Mason
Inventor.
Abia Minor
by Franklin H. Hough
his Attorney

UNITED STATES PATENT OFFICE.

ABIA MINOR, OF HARPER, KANSAS.

DOUBLETREE.

SPECIFICATION forming part of Letters Patent No. 405,316, dated June 18, 1889.

Application filed March 14, 1889. Serial No. 303,258. (No model.)

*To all whom it may concern:*

Be it known that I, ABIA MINOR, a citizen of the United States, residing at Harper, in the county of Harper and State of Kansas, have invented certain new and useful Improvements in Doubletrees; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in doubletrees for wagons, carriages, and other wheeled vehicles; and it has for it object to generally improve upon the construction and render much more durable and servicable in operation this class of devices.

The special and more immediate object of the invention is to provide a whiffletree of construction which will compensate for the twisting to which the doubletree is frequently subjected when in use, and relieve the strain to which certain portions of it are occasionally subjected in drawing heavy loads.

To the above ends and to such others as the invention may pertain the same consists in the peculiar combinations and in the novel construction, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, and in which—

Figure 1 is a top plan view of a doubletree constructed in accordance with my invention, and Fig. 2 is a perspective view of the same.

Like letters indicate like parts throughout the several views.

Reference now being had to the details of the drawings by letter, A designates the pole of a vehicle, to the rear end of which is attached the center of the cross-bar B, through suitable openings formed in the outer ends of which bar pass the brace-rods C C, which rods are provided at their rear or free ends with a suitable eye $a$, which serve as a means of connecting the device to the axle of a vehicle. The opposite or journal ends of the rod C may be secured to the sides of the pole, as is common, or the two rods C may be formed of a single strip of metal passed through an opening in the pole, as shown, and the free ends of the strip bent as desired, and provided with coupling means, as described.

D and $D^2$ are parallel transverse bars, which together form the doubletree proper. These bars are pivotally attached to the upper face of the pole by means of the bolts or pivots $b$ and $b^2$, passed vertically through the metallic strip E, and thence through openings formed in the pole. The strip E is secured at its lower end to the lower face of the pole adjacent to the cross-bar B, and from this point it is bent around the said bar and continued along the upper face of the pole and terminating at a point directly above the forward doubletree-bar D, the forward end of the strip being raised a sufficient distance from the pole to permit the bars D and $D^2$ to be inserted beneath it.

F F are metallic clips forming the connecting-links between the adjacent outer ends of the doubletree-bars D and $D^2$, each of said clips being formed of a single strip of metal bent as shown, and the bar $D^2$ is pivotally secured near the rear end of the clip by means of a vertical pin or bolt $b$.

G G are the singletrees, which are pivotally attached at their centers to the free ends of the doubletree-bar D by means of pins or bolts $d$ passed therethrough and through the free ends of the clips F, as shown.

Within the loops H, formed in the clips F at the rear end of the bar $D^2$, are loosely secured the rings I, to which rings are secured the ends of a cord or strap J, which cord is passed around the pulley or drum K, attached to the upper face of the pole near its rear end.

From the foregoing description the invention will be readily understood and its advantages will be at once apparent. The use of two parallel doubletree-bars having each an independent pivotal connection with the vehicle-pole and pivotally connected together at their ends serves to divide the strain between the several pivots, thus relieving the single pivots, and the connection between the ends of the bar D² by means of the cord or strap J passed around the pulley K serves to equalize the strain upon the doubletree, as will be readily understood.

Having thus described my invention, what I claim to be new, and desire to secure by Letters Patent, is—

1. The combination, with the vehicle-pole and two parallel doubletree-bars, each of said bars being independently pivoted to the pole, the clips F, connecting the free ends of said bars, the rings I, secured to the clips, and the cord J, passed around the drum K upon the pole and connecting the said rings I, substantially as described, and for the purpose specified.

2. The combination, with the vehicle-pole having two independent doubletree-bars pivotally connected at their ends, as described, and the rear bar connected by means of a cord or strap passed around a pulley upon the pole, of the metallic strip E, secured at one of its ends to the lower face of the pole, said strip being extended over the end and along the upper face of the pole and terminating directly above the forward doubletree-bar, substantially as and for the purpose specified.

In testimony whereof I affix my signature in presence of two witnesses.

ABIA MINOR.

Witnesses:
LOUIS WALTON,
M. H. NORTON.